United States Patent
Goret et al.

(10) Patent No.: US 12,462,079 B2
(45) Date of Patent: Nov. 4, 2025

(54) SIMULATION BY SUBSTITUTION OF A MODEL BY PHYSICAL LAWS WITH AN AUTOMATIC LEARNING MODEL

(71) Applicant: BULL SAS, Les Clayes sous Bois (FR)

(72) Inventors: Gaël Goret, Réaumont (FR); Léo Nicoletti, Meylan (FR); Stéphane Pralet, Autrans (FR); Cédric Bourrasset, Lodève (FR)

(73) Assignee: BULL SAS, Les Clayes sous Bois (FR)

( * ) Notice: Subject to any disclaimer, the term of this patent is extended or adjusted under 35 U.S.C. 154(b) by 935 days.

(21) Appl. No.: 17/324,491

(22) Filed: May 19, 2021

(65) Prior Publication Data

US 2021/0365616 A1   Nov. 25, 2021

(30) Foreign Application Priority Data

May 20, 2020 (FR) ..................... 2005181

(51) Int. Cl.
*G06F 30/27* (2020.01)
*B64F 5/00* (2017.01)
*G06N 3/04* (2023.01)
*G06N 3/08* (2023.01)

(52) U.S. Cl.
CPC ............... *G06F 30/27* (2020.01); *B64F 5/00* (2013.01); *G06N 3/04* (2013.01); *G06N 3/08* (2013.01)

(58) Field of Classification Search
CPC .. G06F 30/27; B64F 5/00; G06N 3/04; G06N 3/08
See application file for complete search history.

(56) References Cited

U.S. PATENT DOCUMENTS

2011/0167025 A1* 7/2011 Danai .................... G05B 17/02
                                                                    706/45
2021/0192111 A1* 6/2021 Hoyer .................... G06F 30/13

OTHER PUBLICATIONS

Wu_2019 (A deep learning approach for efficient and accurately evaluating flow field of supercritical airfoils, Computers and Fluids 2019) (Year: 2019).*
Shu_2019 (3D Design Using Generative Adversarial Networks and Physics-Based Validation, Journal of Mechanical Design 2019) (Year: 2019).*
Drag_2019 (Lesson: May the Force Be with You: Drag, TeachEngineering STEM curriculum for K-12, 2019. Downloaded from the wayback machine). (Year: 2019).*
Abbas-Bayoumi, Adel and Becker, Klaus, "An industrial view on numerical simulation for aircraft aerodynamic design," Journal of Mathematics in Industry, vol. 1, No. 10, Dec. 12, 2011.
(Continued)

*Primary Examiner* — Brian S Cook
(74) *Attorney, Agent, or Firm* — Meagher Emanuel Laks Goldberg & Liao, LLP (57) ABSTRACT

A method for simulating the behavior of a system (20) composed by a subsystem (10) in a physical environment (21), by a set of modules, each simulating a portion of said system, wherein at least one portion (11) of said subsystem (10) is simulated by a module implementing a multilayer neural network, the other modules implementing simulations based on behavioral physical laws; said method comprising the assessment (S2) of the results of the simulation to automatically decide (S3) on a strategy to trigger updates (S4) of parameters associated to said multilayer neural network.

8 Claims, 3 Drawing Sheets

(56) References Cited

OTHER PUBLICATIONS

Benichou, Emmanuel et al., "Body Force Modeling of the Aerodynamics of a Low-Speed Fan under Distorted Inflow," International Journal of Turbomachinery Propulsion and Power, vol. 4, No. 3, p. 29, Aug. 21, 2019.
Kingma, Diederik P. and Ba, Jimmy Lei, "Adam: A method for stochastic optimization," arXiv:1412.6980v9, Jan. 30, 2017.
Lecun, Yann et al., "Efficient BackProp," Neural Networks: Tricks of the Trade, pp. 9-48, Springer, 1998.
Marble, Frank E., "Three-Dimensional Flow in Turbomachines," High Speed Aerodynamics and Jet Propulsion, vol. 10, Sec. C, pp. 83-166, 1964.
Thollet, William et al., "Body-force modeling for aerodynamic analysis of air intake—fan interactions," International Journal of Numerical Methods for Heat & Fluid Flow, vol. 26, No. 7, pp. 2048-2065, 2016.
Hsiao, Entsung et al., "Actuator Duct Model of Turbomachinery Components for Powered-Nacelle Navier-Stokes Calculations," Journal of Propulsion and Power, vol. 17, No. 4, Jul.-Aug. 2001.
Raissi, M. et al., "Physics-Informed Neural Networks: A Deep Learning Framework for Solving Forward and Inverse Problems Involving Nonlinear Partial Differential Equations," Journal of Computational Physics, vol. 378, pp. 686-707, Oct. 26, 2018.
French Search Report for corresponding French Application No. 2005181, dated Jan. 25, 2021.
Luis Lopez Vega et al., "A Machine Learning Based Body Force Model for Analysis of Fan-Airframe Aerodynamic Interactions", Proceedings of GPPS Forum 18, pp. 1-9, May 9, 2018.
Mazhar et al, "On using neural networks in UAV structural design for CFD data fitting and classification", Aerospace Science and Technology, vol. 30, No. 1, pp. 210-225, Aug. 29, 2013.
"Training, validation, and test sets", URL:https:jjen.wikipedia.org/w/index.php?t itle=Training, validation, and testsets&o ldid=951517746, retrieved May 18, 2021.

\* cited by examiner

SIMULATION BY SUBSTITUTION OF A MODEL BY PHYSICAL LAWS WITH AN AUTOMATIC LEARNING MODEL

FIELD OF THE INVENTION

The present invention relates to the simulation of a system including subsystems modelled by physical laws. In particular, it may relate to the simulation of a vehicle, for example for designing the vehicle, in order to study its behavior.

More specifically, the invention provides a method for simulating a vehicle, in particular an aerial vehicle, within a system, by substitution of the modelling by physical laws of a portion of the simulated vehicle with a model by machine learning.

CONTEXT OF THE INVENTION

The design of a vehicle, in particular of an aerial vehicle such as a helicopter or an airplane, is a complex process involving many persons for several years and a considerable budget, whether it consists of a design of a new vehicle or of a new version of an existing vehicle.

Numerical tools, in particular simulation, allow minimizing these costs, by allowing testing different configurations of the design of elements of the vehicle according to the environment, this environment comprising in particular the other elements of the vehicle. These simulations are based on physical models describing the behavior, in particular aerodynamic, of the different elements of the vehicle according to its environment and the interfaces between the vehicle and the environment.

The simulations may allow determining the impact of each design choice, and thus exploring a larger number of possibilities that could not be possible to consider by real-world tests. In particular, it is possible to determine the impact of each choice for an element of the vehicle on the entire vehicle and, in particular, draw conclusions on the overall manufacturing cost, on the energy consumption, on the generated noise, etc. In manufacturing engineering, this iterative process is called generative design.

Nonetheless, this problem is extremely complex, because an aerial vehicle, as such, is a complex system formed by too many different elements. Furthermore, their interactions and the interactions with the environment are numerous and difficult and costly to model in an accurate way by physical laws. Furthermore, the dynamic aspect of the environment has to be taken into account since an aerial vehicle passes through different phases during a flight (climb, stationary flight, descent, landing, etc.), each involving different physical constraints (in particular aerodynamic) on the aircraft.

Despite the rise in power of information processing platforms, a tradeoff has conventionally to be made between the accuracy of the physical models describing the behaviors of each element of the simulated vehicle and the computer cost of the simulation (cost of the platform and processing time).

Thus, some physical models used in computational fluid dynamics (CFD) such as those based on Navier-Stokes's equations, are still too costly, in terms of computing time, to enable use thereof in industrial simulation. Furthermore, the existence of a solution is not proven and even calls upon the mathematics community.

Henceforth, approximations are generally used. The use of Reynolds's decomposition applied to the solutions of Navier-Stokes's equation allows simplifying the problem by suppressing fluctuations with short periods and amplitudes. The method is known under the term RANS, standing for "Reynolds-averaged Navier-Stokes", or "averaged Navier-Stokes's equation". Nonetheless, this simplification of the calculations is achieved at the expense of accuracy.

These problems related to the practical implementation of the physical modelling of the constituent elements of an airplane are presented, for example, in the article by A. Abbas-Bayoumi and K. Becker, "An industrial view on numerical simulation for aircraft aerodynamic design", in Journal of Mathematics in Industry, 1(1):10, 2011. doi: 10.1186/2190-5983-1-10.

It has been suggested to substitute some physical models of the simulation for models based on machine learning.

In particular, the article "A Machine Learning Based Body Force Model for Analysis of Fan-Airframe Aerodynamic Interactions" by Luis Lopez de Vega, Guillaume Dufour, Florian Blanc and William Thollet, in Global Power and Propulsion Society Conference 2018, 7 May 2018-9 May 2018 (Montreal, Canada), suggests substituting a portion of the turbulences modelling by Reynolds's method for a machine-learning model. The considered model is a multilayer perceptron type neural network. Moreover, the article highlights accuracy problems of the neural model and provides, in particular, a method for improving the accuracy thereof, by learning and by comparing its performances with other simulation mechanisms based on computational fluid dynamics.

Nonetheless, these works aim to substitute a simulation model for another, and focus on the gains and advantages of this substitution. Most of them do not mention the substitution of one (or possibly several) module(s) of an overall simulator for a simulator based on machine learning. Furthermore, none of them mention the problems of coupling, within the same simulation product, modules based on physical laws and modules based on machine learning.

SUMMARY OF THE INVENTION

The object of the present invention is to provide a solution overcoming at least partially the aforementioned drawbacks. In particular, the invention aims to enable such a coupling.

The invention also allows getting rid of the computing complexity of some modules of the simulator through the use of a model based on machine learning. Thus, it allows avoiding the "bottleneck" formed by some modules by shifting the computing aspects onto a learning phase of a predictive model that could be used during the simulation instead of the initial module, based on physical laws.

In a general and schematic way, the present invention partially or totally substitutes solving the physical equations of a subsystem with the inference of an artificial intelligence and provides a method for developing this artificial intelligence In particular, the present invention provides a method for simulating the behavior of a system composed by a subsystem in a physical environment, by a set of modules, each simulating a portion of said system, wherein at least one portion of said subsystem is simulated by a module implementing a multilayer neural network, the other modules implementing simulations based on behavioral physical laws; said method comprising the assessment of the results of the simulation to automatically decide on a strategy to trigger updates of parameters associated to said multilayer neural network According to preferred embodiments, the invention comprises one or more of the following features which may be used separately or in partial combination with each other or in total combination with each other:

said updates comprise one or several action(s) among:

a) an enlargement of a learning set by interpolation of the data of said set and a retraining of said multilayer neural network on said learning set;

b) a modification of the physical parameters of the physical model for generating the learning set and a retraining of said multilayer neural network on said learning set;

c) a modification of the meta-parameters of said neural network;

said meta-parameters comprise those determining the architecture of the neural network;

said subsystem is an aerial vehicle;

said portion is a turbojet engine;

the decision on a strategy is based on a time cost associated to each of said actions;

the decision on a strategy is based on a history of the already triggered actions.

when the assessment brings out a local lack of accuracy of said simulation, said enlargement of a learning set by interpolation of the data of said set and a retraining of said multilayer neural network on said learning set, is primarily triggered.

Another aspect of the invention relates to a method for designing an aerial vehicle including the previously-described simulation method.

Another aspect of the invention relates to a simulation device for the implementation of a method as described before.

Thus, one advantage is to achieve a coupling between the modules based on physical laws and the modules based on machine learning. In particular, according to some embodiments, the results of the overall simulation may be used to determine, over the wire, meta-parameters of the module(s) based on machine learning.

Another advantage is that the suggested approach is not intrusive, that is to say the other modules implementing the simulation are not affected by the substitution. Thus, it is possible to connect the modified module in an existing simulation product by taking advantage of the existing interfaces and therefore with a lower extra development cost.

Thus, implementations of the invention enable the simulation of a system composed by a subsystem such as an aerial vehicle, within a physical environment, for example for the design of such an aerial vehicle. The efficiency of the invention allows enhancing the quality of the simulation while keeping simulation times compliant with industrial requisites. Thus, the design of devices such as aerial vehicle is facilitated.

Other features and advantages of the invention shall become apparent upon reading the following description of a preferred embodiment of the invention, provided as example with reference to the appended drawings.

DETAILED DESCRIPTION OF THE INVENTION

The invention is prone to be applied to any simulation of a complex system modelled by behavioral physical laws, typically fluid dynamics laws. Thus, it may relate to the simulation of meteorological systems, for example, or the behavior of a subsystem with regards to a fluid medium within a system, this subsystem may be a vehicle, in particular.

In particular, the invention may be applied to the situation where a portion of a subsystem to be simulated could correspond to a physical modelling distinct from that of the other portions of the subsystem. For example, it may be applied to the situation of a subsystem, a portion of which corresponds to a particular topology or dynamics, for example moving blades.

Thus, the invention may be applied to a subsystem such as a wind turbine in the air fluid medium, or other devices operating similarly, that is to say with blades immersed a fluid stream: radial and axial compressors in airplane turbojet engines, in air-conditioning devices, in gas pipelines, in turbo-compressors, etc.

The invention may also be applied to different types of vehicles for which there are problems related to the plurality of elements to be simulated and to the complexity of at least some of them to be simulated by physical laws.

In particular, it applies to aerial vehicles for which the simulation by the physical laws of aerodynamics generates difficulties of implementation, in particular in terms of accuracies and computing cost. In particular, these aerial vehicles may be helicopters, airplanes, etc.

For such a subsystem, according to an embodiment of the invention, a portion of the vehicle corresponding to the turbojet engines wherein blades are moving, may correspond to a physical modelling distinct from the rest of the subsystem.

The invention may also be applied to other types of vehicles, in particular marine or submarine vehicles, for which the physical laws of hydrodynamics pose similar problems.

Figure 1:
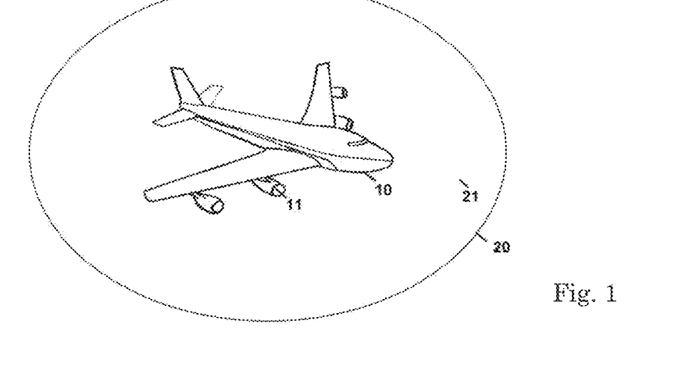
FIG. 1 schematically represents an example of a system composed by an aerial vehicle and of its environment according to an implementation of the invention.

FIG. 1 illustrates an example of application to an aerial vehicle such as an airplane, without loss of generality.

The method and the device according to the invention aim to simulate the behavior of a system 20 composed by an aerial vehicle 10 in its ambient physical environment 21. Indeed, in order to simulate the behavior of the aerial vehicle 10, it is necessary to also simulate the interactions between the latter and its environment and in particular the influence of the airplane on its environment.

Such a system may be simulated by software tools implementing numerical fluid mechanics techniques, CFD (standing for "Computational Fluid Dynamics") in order to determine the interactions between the vehicle 10, or some portions 11 of the vehicle, such as a nozzle of a turbojet engine, and the physical environment 21 in which it circulates.

For example, mention may be made of the software commercialized by the company Dassault Systems, such as the software product "Simulia". Mention may also be made of the software "Flow Simulator" of the company Hyper- Works, with different physical simulation modules ("elsA" produced by the ONERA, "Su2" of the University of Stanford, etc.).

The computational fluid dynamics, CFD, consist in studying the movements of a fluid (in this instance, air) and their effects by the numerical solving of the equations governing the fluid. Depending on the selected approximations, which are generally the result of a tradeoff in terms of physical representation needs with regards to the available computing or modelling resources, the solved equations may be Euler's equations, Navier-Stokes's equations, etc.

In general, solving a computational fluid dynamics problem passes through the preparation of the problem: this passes through the definition of a geometry, of a meshing discretizing the computation field, the selection of the used numerical models and methods;

the numerical solving of the problem which passes through the execution of a computer program implementing a mathematical modelling of the behavior of the system 20.

Other aspects of the behavior of the system 20 may also be covered such as the thermal aspects.

In general, this technique based on fluid mechanics aims to provide a model based on behavioral physical laws, that is to say to approximate the behavior of the system by physical laws, or equations. By applying these laws, or equations, it is possible to estimate the behavior of the system.

The meshing consists in splitting the space into cells called "control volumes". The meshing is often delicate in fluid mechanics because the entire space of the system 20, including the "empty" space formed by the physical environment 21, has to be meshed. Hence, this results in a large meshing volume.

Furthermore, the surface details are important since these could generate turbulences. This results in the necessity of a very fine meshing, in particular in proximity to the surfaces (that is to say at the interface between the airplane 10 and the physical environment 21).

Henceforth, we have therefore often ended with meshings containing too many meshes (typically several millions).

Moreover, while in mechanics of materials, a hexahedral meshing of the space is an interesting strategy (it allows having the same results quality for a smaller number of nodes), in computational fluid dynamics, this introduces preferential directions which might have an influence on the result.

Also, other meshing types are possible, such as the hexahedral meshing, and non-uniform meshings, enabling different resolutions or different typologies or orientations, according to the areas. For example, it is possible to have proximate to the surfaces (airplane/environment interfaces), a meshing parallel to the surface—hexahedral or prismatic (hexahedrons cut in half)—and with a small thickness (three layers of cells for example);

at the core of the volumes, a tetrahedral meshing but deprived of any particular direction and, for example, with a lower resolution.

Some systems 20 to be simulated might be extremely complex and involve various physical phenomena. This is in particular the case of an aerial vehicle such as an airplane which poses different physical problems: lift of the wings, turbulence at the intake (fan) and at the outlet (nozzles) of the turbojet engines, etc.

Henceforth, the system may be split into a plurality of physical models, some of these models may be dedicated or adapted to a portion of the system 20.

For example, the phenomena of turbulences at the intake or at the outlet of the turbojet engines have been the subject of specific studies on the aerodynamic phenomena involved.

A frequently used approach is the body force model, BFM, which aims to replace the blades of the turbojet engine with equivalent force fields.

This model has been suggested by Marble, F. E, 1964, "Three-Dimensional Flow in Turbomachine" in High Speed Aerodynamics and Jet Propulsion, Vol. 10, Sec. C, Princeton University Press, pp. 83-166. It has since been widely applied, as indicated for example in Hsiao, E., Naimi, M., Lewis, J. P., Dalbey, K., Gong, Y. and Tan, C., "Actuator Duct Model for Turbomachinery Components for Powered-Nacelle Navier-Stokes Calculations," Journal of Propulsion and Power, vol. 17, no. 4, July-August 2001, or Thollet, William and Dufour, Guillaume and Carbonneau, Xavier and Blanc, Florian "Body-force modeling for aerodynamic analysis of air intake—fan interactions" in (2016) International Journal of Numerical Methods for Heat & Fluid Flow, vol. 26 (no 7). pp. 2048-2065. ISSN 0961-5539

One of the advantages of this model is its integration into computational fluid dynamics simulators, in particular in Reynolds-averaged Navier-Strokes equations (RANS model).

Also, the simulators aggregate modules, each simulating a portion of the system 20 and capable of implementing a different model. These modules may consist of portions of the computer code of the same software entity, but they may also consist of standalone software entities interacting by means of interfaces defined beforehand. It is understood that these aspects relate to the software architecture implementation. The invention disclosed herein below is independent of these architectural choices, which belong to the developer and/or to the used simulation tool choice.

The models of each module may be different by nature (different technology, different modelling equations) or simply by different values assigned to some parameters for the same mathematical modellings.

By different technology, it should be understood in particular a model based on behavioral physical laws and a model based on machine learning. In particular, this model based on machine learning may be a multilayer neural layer.

According to the invention, at least one portion of the aerial vehicle 10 is simulated by a module implementing a multilayer neural network, the other modules implementing simulations based on behavioral physical laws. In other words, a model based on a multilayer neural network is substituted for at least one of the models based on the behavioral physical laws according to fluid mechanics (CFD).

According to an embodiment of the invention, such a multilayer neural network could model the behavior of an inlet (fan) and/or of an outlet (nozzle) of a turbojet engine, 11, of the airplane 10, in particular the turbulences created by such devices in interaction with the environment 21.

In a quite macroscopic way, the multilayer neural networks may be perceived as black boxes whose internal parameters have to be adjusted through a learning, or training, phase by presenting to them both input data and a desired output (or "label"). The error between this desired output and the "natural" output of the network allows slightly adjusting the parameters to reduce the error. By presenting a large number of these "input data/desired output" pairs, the network learns how to properly react and to supply a good output when new unlabeled input data are presented thereto.

According to an embodiment of the invention, the used neural network may be a multilayer perceptron. Other architectures of neural networks may be possible. In particular, a convolutional neural network may be used (ConvNet or CNN, standing for "Convolutional Neural Network").

Figure 2:
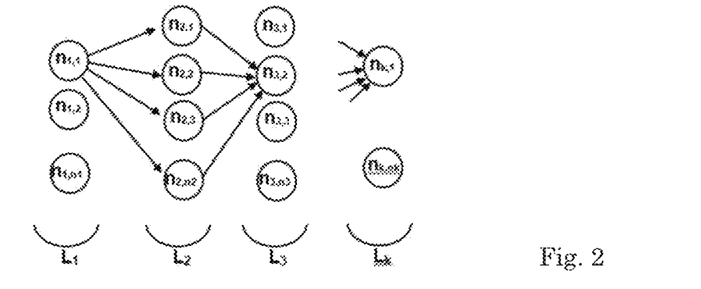
FIG. 2 schematically illustrates a multilayer neural network like those that can be used in the context of an implementation of the invention.

The multilayer perceptron (MLP) is a type of artificial neural network organized into several layers within which information circulates only from the input layer L1 towards the output layer Lk; it therefore consists of a feedforward network. Each layer L1, L2, L3 . . . Lk is constituted by a variable number of neurons, respectively n1, n2, n . . . nk. The neurons of the last (so-called "output") layer are the outputs of the neural network and representative of a prediction of the model in response to an input supplied on the layer L1.

In a multilayer perceptron, each neuron ni,j is connected at the output to all of the neurons of the next layer Li+1. Conversely, it receives at the input the outputs of all of the neurons of the previous layer Li−1. In FIG. 2, for clarity, only some connections are represented by directed arrows.

Each connection is associated to a weight. The set of weights form the internal parameters of the neural network. They have to be determined during a learning (or training) phase and then allow predicting output values, by generalization, from a new input vector presented on the input layer L1.

Conventionally, each neuron ni,j performs a weighted sum of these inputs with the weights of the associated connections and then applies an activation function to this sum.

There are several techniques to determine the internal parameters of the network, the thresholds, by learning. In particular, mention may be made of the stochastic gradient descent (SGD) algorithm, described for example in LeCun, Yann A., et al. "Efficient backprop. Neural networks: Tricks of the trade", Springer Berlin Heidelberg, 2012. 9-48. Mention may also be made of ADAM, initially described in Diederik P. Kingma and Jimmy Lei Ba. "Adam: A method for stochastic optimization". 2014. arXiv:1412.6980v9, or RMSprop, described in particular in Tijmen Tieleman and Geoffrey Hinton, "Lecture 6.5-rmsprop: Divide the gradient by a running average of its recent magnitude", COURSERA: neural networks for machine learning, 4(2):26-31, 2012.

One of the aspects of the invention consists in enabling the learning and the determination of all of the parameters of the multilayer neural network. In particular, the overall simulation of the system 20, encompassing models based on behavioral physical laws and one or several model(s) based on neural networks, may be assessed in order to enable the adjustment of some parameters of the neural network. Thus, we obtain a coupling between the model by neural network, substituted for the model by physical laws, and the models by non-substituted physical laws.

In particular, the parameters of the neural network comprise:
  the internal parameters, or weights, associated to the connections between the neurons, and being determined iteratively by learning (or training);
  meta-parameters determining the architecture of the neural network: number of layers, number of neurons in each layer, etc.
  the data of the learning set, which enable the determination of the weights;

the cost function which allows estimating the output error of the neural network and determining, by backpropagation, the adjustments to be made to the weights of the network for each data of the learning set;
  the convolution kernels, in the case of an embodiment based on convolutional neural networks.

In general, these parameters relate either to the weights of the neural network (internal parameters) or to the meta-parameters of the neural network (including the cost function), or to the learning set on which the neural network is trained.

According to an embodiment of the invention, an adaptation of the meshing of the learning set based on the residual error ("Residual error based adaptive mesh refinement"). This mechanism allows sampling, during the learning, in a denser manner, the areas that are less properly predicted by the model (that is to say which have a greater value of the residue function). This allows automatically increasing the density of the data in the areas that are the most difficult to predict (disturbances, surface areas, etc.).

This multilayer neural network is trained by means of training data derived either from the physical world, or from a modelling of the physical world, that is to say from a model based on behavioral physical laws as described before.

There are at least two ways to do so:
  it is thus possible to train the neural network based on a learning set generated by a behavioral physical model;
  it is also possible to constrain the learning mechanism itself by the physical modelling, in particular by acting on the cost function.

A neural network trained according to this second approach is sometimes called "Physics-Informed Neural Network" (PINN). For example, it has been described in the article "Physics-Informed Neural Networks: A Deep Learning Framework for Solving Forward and Inverse Problems Involving Nonlinear Partial Differential Equations" by Raissi, Maziar, Perdikaris, Paris, and Karniadakis, George E, in Journal of Computational Physics, 2019

The behavioral physical laws may be in the form of a system of partial differential equations in the form $$\partial_t u + \mathcal{N}[u;\lambda]=0 \qquad [\text{Math. 1}]$$

wherein $\mathcal{N}[\ ]$ is a non-linear operator on the function u with $\lambda$ as a parameter.

Such a formalism allows expressing a large number of problems arising in behavioral physics: law of conservation of energy, diffusion process, advection-diffusion-reaction systems, kinetic equations, etc.

We call f(x,t) the residue of the partial differential equation at the point (x, t) and we seek to approximate the function u by a multilayer neural network. We obtain the system:

$$\begin{cases} u(x,t) \cong NN(x,t) \\ f := \partial_t u + \mathcal{N}[u;\lambda] \end{cases} \qquad [\text{Math. 2}]$$

where "NN(x,t)" represents the output of the neural network, that is to say the vector of the outputs of each neuron of the output layer.

In the context of the use of this system for prediction purposes, the problem amounts to searching the hidden state u(x,t)

The neural network aims to iteratively approximate the function u while minimizing a cost function c taking into account both a cost cu expressing the prediction capability of the neural network, and a cost cf expressing the constraints related to the physical modelling. Typically c=cu+cf.

It is possible to express these costs as mean square errors. The cost c may then be expressed:

$$\begin{cases} \frac{f_n h}{W^2} \cong NN_{f_n}\left(\frac{x}{r_{tip}}, \frac{x}{r_{tip}}, M_r, \beta, \frac{C_p T}{U_{tip}^2}\right) \\ \frac{f_p h}{W^2} \cong NN_{f_p}\left(\frac{x}{r_{tip}}, \frac{x}{r_{tip}}, M_r, \beta, M_r^{LE}, M_r^{tE}, \beta_r^{LE}, \beta_r^{tE}\right) \end{cases}$$ [Math. 4]

The term $c_f$ penalizes the solutions derived from the neural network which do not (or not sufficiently) meet the physical constraints expressed by the function f.

According to an embodiment of the invention, a model based on body forces (or "body force model", BFM) may be replaced. This model is particularly interesting for simulating devices with complex and dynamic geometry, such as turbojet engines. In particular, this model allows taking into account the dynamics of the moving blades, in order to integrate them into the RANS equations as explained before.

Such a modelling is described in particular in "Body Force Modeling of the Aerodynamics of a Low-Speed Fan under Distorted Inflow" by Emmanuel Benichou, Guillaume Dufour, Yannick Bousquet, Nicolas Binder, Aurelie Ortolan and Xavier Carbonneau in Int. J. Turbomach. Propuls. Power, 2019, 4(3), 29

The equation describing the learning then becomes:

$$c = c_u + c_f \text{ with } \begin{cases} c_u = \frac{1}{N_u}\sum_{i=1}^{N_u} |u(t_u^i, x_u^i) - u^i|^2 \\ c_f = \frac{1}{N_f}\sum_{i=1}^{N_f} |f(t_f^i, x_f^i)|^2 \end{cases}$$ [Math. 3]

with:
$f_n$ the normal component of the body force f
$f_p$ the parallel component of the body force f;
h the local pitch of the blades of the turbojet engine;
W the relative velocity
x the axial coordinate,
$r_{tip}$ the radial coordinate of the tip of the rotor;
$M_r$ the relative Mach number that qualifies the compressibility of the fluid;
β the relative azimuth angle of the stream;
$C_p$ the heat capacity;
T the static temperature;
$U_{tip}$ the speed of the tip of the rotor;
And "LE" and "TE", as exponents, indicate that the value is measured, respectively, at the leading edge (LE) or at the trailing edge (TE) of the blades.

It is possible to write the cost function:

$$J(\omega) = \frac{1}{N}\sum_{i=1}^{N}(\tilde{f}_i^\omega - f^i)^2 + \frac{1}{N}\lambda\sum_{i=1}^{M}\omega_j^2$$ [Math. 5]

with:
ω the weights of the neural network;
N the number of samples in the learning set;
M the number of weights in the neural network;
and λ a regularization parameter.

Hence, the multilayer neural network may take in as an input vector a set of variables which, typically, characterize the stream flow in the turbojet engine as indicated hereinabove.

At the output, this multilayer neural network may predict in particular variables that characterize the normal fn and parallel fp components of the body force f.

Figure 5:
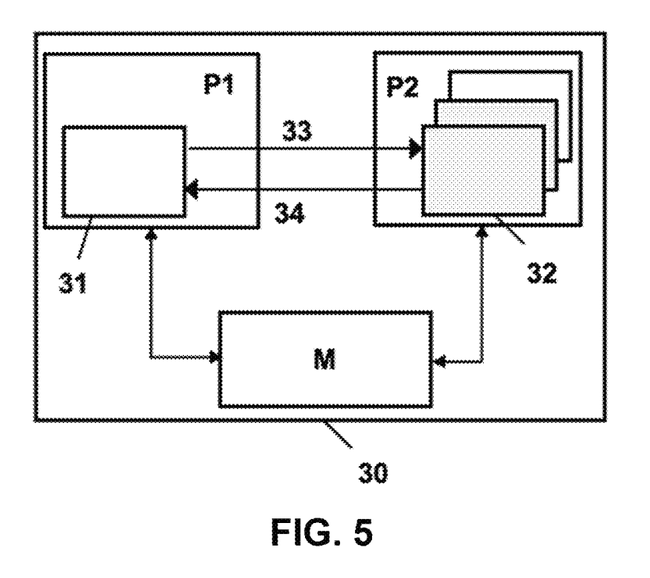
FIG. 5 illustrates an example of a simulator including a set of modules, according to an embodiment of the invention.

FIG. 5 illustrates an example of a simulator 30 including a set of modules, 31, 32, which may be configured on one or more processors (P1, P2) _operably connected to a non-transitory computer readable medium (M) containing instructions, that, when executed, caused the simulator to perform the disclosed method. Preferably, the module 31 implements a multilayer neural network allowing predicting the body forces f of a portion of a subsystem of a simulated system, for example a turbojet engine, from the data 34 supplied by the other modules 32 of the simulator 30. The predictions of the neural network 31 are transmitted, 33, to these other modules 32, so as to form an iterative loop.

Figure 3:
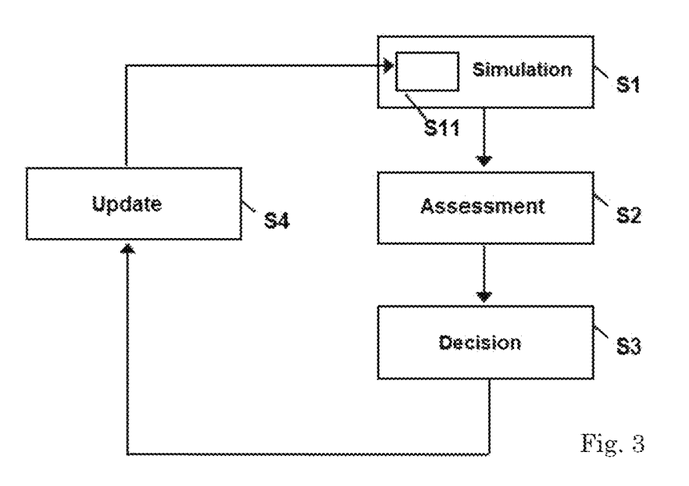
FIG. 3 schematically represents an example of a flowchart according to an implementation of the invention.

FIG. 3 illustrates the different steps of the method according to an embodiment of the invention.

At a step S1, the simulation software performs a simulation of the system 20, including a substep S11, wherein at least one portion of the aerial vehicle 10 is simulated by a module implementing a multilayer neural network. As will be seen later on, this multilayer neural network is trained at a step S5.

At a step S2, the results of this simulation may be assessed.

It should be noted that this assessment, at step S2, is different from that performed during the training of the neural network, at step S5, by means of a cost function ("loss function") applied at the output of the network.

Indeed, the assessment of step S5 aims to optimize the simulation in its entirety, that is to say including step S1 which includes the substep S11 but is not restricted thereto. Hence, in particular, this assessment step enables the optimization of the coupling between the multilayer neural network and the other modules of the simulator, based in particular on computational fluid dynamics.

This assessment, S2, may allow triggering corrective actions, at step S4, which could concern the entirety of the simulation process, as will be seen later on.

This assessment S2 may be based on objective measurements of the quality of the inference in the context of the coupling of the multilayer neural network with the other modules of the simulation.

In particular, the assessment comprises the estimation of the accuracy of the simulation, both globally and locally. In particular, the assessment may allow determining areas in the simulated system 20, wherein the accuracy is insufficient.

For this purpose, an objective function may be supplied, allowing bringing out these accuracy problems of the result of a simulation, according to an expected result.

This objective function may be designed to represent the art knowledge allowing, on the one hand, measuring a quality of the performed simulation, this measurement having to be iteratively maximized, and, on the other hand, detecting the causes affecting this quality measurement.

Hence, it allows automatically detecting error types of the simulator and thus be able to propose (at step S3) the most suitable corrective, in order to improve, at the next iterations, the simulation including (or "enhanced with") the multilayer neural network.

In general, the assessment may be automatically supplied by the simulation software. It may be derived from a measurement of the energy in computational fluid dynamics based software.

The results derived from the simulation have to contain enough information to allow guiding the parametric search. After an initialization phase, it is possible to exploit all of the associations between the hyper parameters and the value of the objective function (or cost). This initialization phase may be random, or through other heuristics such as latin hypercube sampling (LHD)

These associations allow regressing the optimization space wherein we move to assess a new point (defining a new iteration with a new set of parameters), which provides more and more knowledge over the wire regarding the relationship relating the parameters and the performance of the simulation.

The assessment may also be (partially or totally) supplied manually by an engineer who analyses the results of the simulation.

This assessment is "online", that is to say it is performed over the wire during a new simulation of the system. In other words, the simulation forms a feedback loop which may trigger a re-learning of the multilayer neural network. Hence, in contrast with some usual solutions, there is no clear separation between a learning phase and an exploitation (or prediction) phase of the neural network, the two phases being interleaved.

According to one embodiment, a sampling may be performed in order to perform an assessment only on a sample (for example periodical) of the performed simulations.

Thus, each simulation is likely to trigger an adaptation of the neural network model, so as to minimize its prediction error in the overall context of the simulation of the system 20 and, therefore, to improve the accuracy of the subsequent simulations.

Depending on this assessment of the simulation, a decision step S3 consists in automatically deciding on a strategy for triggering updates, at a step S4, of the parameters associated to the multilayer neural network. The aim is to iteratively optimize the assessment of the simulation, by minimizing the raised problems (in particular of global or local lack of accuracy).

Hence, in particular, the problems detected at the assessment step S2 allow guiding a strategy for optimizing the neural model so that, in the subsequent simulations, its prediction is more compliant with the real world, and thus the simulations have a better accuracy.

The decision step S3 may implement heuristics allowing determining a strategy according to the result of the assessment step S2.

These heuristics may be implemented in different ways. In particular, they may correspond to a set of computer rules. These computer rules may reflect rules of the industry that allow considering the different situations that might arise.

As illustrative examples, it is possible to identify different types of objective functions which inform us on the status of the coupling between the multilayer neural network and the other modules of the simulator.

Feedback on the errors of the simulation tool: for example presence of values that are physically aberrant, of a "Nan" ("not a number") situation.

It is also possible to get information on the spatial location of the lack of accuracy, the limit of application of the numerical methods.

Cost function based on the residues of physical quantities. These residues are available at the output of the modules of the simulator (and are applied at the input of the multilayer neural network).

This function may be based on the Energy of the simulated system (kinetic Energy, Hamiltonian, etc.). It is also possible to determine whether the neural network is used away from its training area (spectrum of the inputs), or whether it is adapted to the inputs encountered in the simulation.

Check-up of the quantity derived from a model of energy damping in the dynamics (according to Kolmogorov's theory). This check-up may be performed asynchronously.

Figure 4:
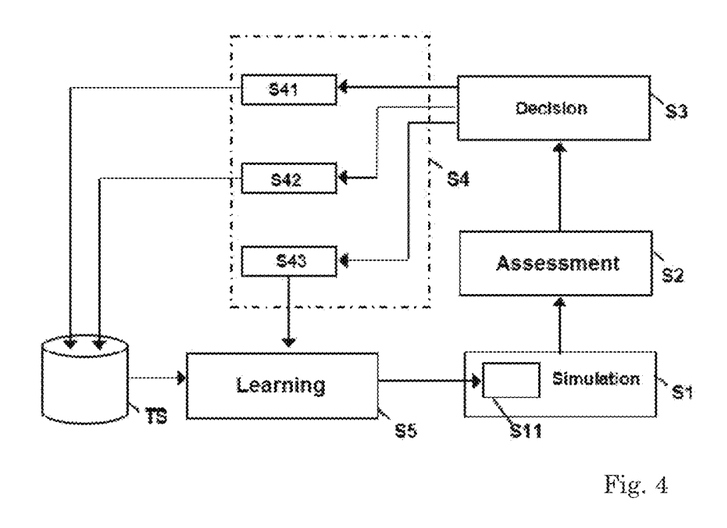
FIG. 4 schematically represents a more detailed example of a flowchart, according to an implementation of the invention

FIG. 4 illustrates a more accurate implementation of the mechanisms of decisions and updates of the parameters associated to the neural network model.

In particular, the decision step S3 may trigger different update actions, S41, S42, S43, which could act either on the learning mechanism S5 (meta parameters, etc.), or on the learning base TS on which the neural network is trained, during the learning step S5.

Thus, we end up with a feedback loop according to which the simulation S1, comprising the simulation by neural network S11, is assessed, S2, in order to determine, S3, a strategy for updating, S41, S42, S43 parameters of the neural network. The neural network may be retrained, based on these parameters, in order to improve the predictive performances of the neural network at the next simulation S1.

The training of the neural network may be performed over the wire, that is to say each time new parameters are determined, or periodically.

A possible update may consist, at step S41, in performing an enlargement (or enrichment) of the learning set TS by interpolation. This enlargement may be local.

For example, if the assessment S2 of the simulation brings out a lack of accuracy over an area of the simulated system 20, the decision mechanism S3 may apply a strategy consisting in triggering a re-sampling of the data of the learning set TS over this area, in order to train the neural network more effectively and to confer better prediction performances thereon over this area.

Another possible update may consist, at step S42, in modifying the physical parameters of the physical model for generating the learning set TS.

This physical model aims to simulate by behavioral physical laws the behavior of the portion of the system 20 simulated by the neural network. In other words, this model corresponds to that one substituted for the neural network in the context of the simulation, S1, but its use herein consists in generating the data of the learning set TS used for training the neural network.

Typically, this physical model generates learning data, associating input data, formed by the conditions at the interfaces of the simulated portion of the aircraft (temperature, air vector, etc. at each point of the meshing), to labels that represent the results of the physical simulation and the desired output for the neural network.

As mentioned hereinabove, the simulation by behavioral physical laws (based in particular on computational fluid dynamics, CFD), is subjected, in simulation, to a tradeoff between the accuracy and the necessary computing time. To the extent that this physical model is used in the context of generation of the learning set TS, the time constraints are fewer, since the learning could be decorrelated from the simulation stream S1. In other words, we thus benefit from the relatively constant computing time of the inference by neural network, this cost being shifted onto the learning phase.

Henceforth, the tradeoff may be quite different and favor accuracy at the expense of computing time, which is herein less impactful on the computational performances of the simulation. In particular, the parameters of this physical model may comprise the meshing of the system 20, as described before.

Thus, if the assessment S2 of the simulation brings out a lack of accuracy over an area of the simulated system 20, the decision mechanism S3 can apply a strategy rule consisting in triggering a modification of the parameters of the physical model for generating the learning set TS, in particular the meshing of the system 20.

Another possible update may consist, at step S43, in modifying the meta-parameters of the neural network. In particular, these meta-parameters comprise those determining the architecture of the neural network: number of hidden layers, number of neurons for each layer, activation function (softmax, ReLu, etc.), etc.

For example, if the monitoring of the quantity derived from an energy damping model brings out a convergence problem, some meta-parameters of the neural network may be modified, for example in order to enlarge the capacity thereof (increase of the number of layers and/or of neurons per layer).

Step S3 of automatically deciding on a strategy for triggering the updates, S41, S42, S43 implements heuristics allowing selecting the best update action(s) according to predefined criteria.

In particular, these heuristics may be based on:
The "local or global" characterization of the accuracy problems, raised in the assessment of the overall simulation;
The computing cost of each possible action;
The history of the previously-triggered updates;
A measurement of the discrepancy between the limit conditions of the training and of the use in simulation. Indeed, it is essential to check that the training set TS actually corresponds to the inputs applied to the neural network during the use thereof in prediction. If so is not the case, step S42 could be deployed in order to enrich the training set TS according to the actual use.

Thus, the decision S3 may be based on the cost of the computer processing associated to the possible actions.

For example, an enlargement, S41, of the learning set TS by interpolation is, at first glance, less costly than the modification, S42, of the parameters of the physical model for regenerating the learning set TS. Also, when the assessment S2 of the simulation S1 brings out a local lack of accuracy, the decision may consist in preferring the first action rather than the second one.

This choice may be based not only on this criterion alone but on multi-criteria heuristics whose computing time is one of the criteria, possibly associated to a weight.

Another criterion may be the update history. This history may allow avoiding triggering an update type that has already been tested without giving conclusive results and/or to propose an escalation in the update actions that might become detrimental according to other criteria. More generally, the history of the tested parametric values, associated to their performance (result of the cost function) forms a landscape wherein new points could, iteratively, be tested in order to find an optimum.

Thus, it is possible to first propose a first action that is barely costly in terms of computing cost, and then, if the same problem arises again at a subsequent iteration, trigger actions that are more costly.

Considering again the previous example, in the event of detection of a local lack of accuracy, an enlargement, S41, of the learning set TS by interpolation is primarily triggered, that is to say it could be triggered at first, and then, in a subsequent iteration, if the same problem arises (over the same area), a modification, S42, of the physical parameters of the physical model for generating the learning set TS could be triggered.

Thus, it is possible to improve the quality of the predictive model. This improvement may be done in parallel with the exploitation of the model in simulation. This means that the assessment S2, decision S3, update S4 loop allows triggering a new learning which allows generating a new version of the predictive model. It is possible to consider that a new predictive model is used once it has sufficiently evolved. A criterion may be set up to trigger the replacement of a model with a new version§.

Of course, the present invention is not limited to the examples and to the embodiment that have been described and represented, but it may be subject to many variants accessible to those skilled in the art.

The invention claimed is:

1. A method for simulating the behavior of a system composed by an aerial vehicle in a physical environment, said method being implemented by a simulator comprising one or more processors operably connected to a non-transitory computer medium and a set of modules configured on said one or more processors, each simulating a portion of said system, wherein one module of said set of modules is configured to simulate at least one portion of said aerial vehicle comprising a turbojet engine of said aerial vehicle by implementing a trained multilayer neural network, said at least one portion corresponding to a physical modelling distinct from that of other portions of said aerial vehicle, wherein other modules of said set of modules are configured to implement simulations based on behavioral physical laws and wherein the trained multilayer neural network has been trained to predict output data from input data supplied by at least one of said other modules, said input data comprising a set of variables which characterize a stream flow in the turbojet engine, said output data comprising variables which characterize normal and parallel components of body forces of the turbojet engine being transmitted to at least one of said other modules, said method comprising:
receiving by the simulator configuration data of a design of the aerial vehicle;
performing by the simulator a simulation of the system and outputting results of the simulation;
assessing by the simulator the results of the simulation based on an objective function, said assessing comprising measuring an accuracy of the simulation and determining areas in a simulated system, wherein the accuracy of the simulation is insufficient according to an expected result, to automatically decide a strategy to trigger updates of parameters associated to said trained multilayer neural network;
when a decision is made, triggering by the simulator said updates of parameters associated to said trained multilayer neural network is made, according to said strategy, so as to improve an accuracy of subsequent simulations; and
iterating by the simulator the performing of a simulation using the updated trained multilayer neural network module and the assessing of the results of the simulation.

2. The method according to claim 1, wherein said updates comprise:

enlarging a learning set by interpolation of the data of said learning set and a retraining of said trained multilayer neural network on said learning set;
modifying physical parameters of a physical model for generating the learning set and a retraining of said trained multilayer neural network on said learning set;
modifying meta-parameters of said neural network,
or a combination thereof.

3. The method according to claim 2, wherein said meta-parameters comprise those determining an architecture of the neural network.

4. The method according to claim 1, wherein the decision of the strategy is based on a time cost associated to each action in the strategy.

5. The method according to claim 1, wherein the decision of the strategy is based on a history of previously triggered actions.

6. The method according to claim 1, wherein when the assessment brings out a local lack of accuracy of said simulation, said updates comprise enlarging a learning set (TS) by interpolation of the data of said learning set and a retraining of said trained multilayer neural network on said learning set.

7. A simulator for simulating the behavior of a system composed by an aerial vehicle in a physical environment, said simulator comprising one or more processors operably connected to a non-transitory computer medium and a set of modules configured on said one or more processors, each of said modules simulating a portion of said system,
wherein one module of said set of modules is configured to simulate at least one portion of said an aerial vehicle comprising a turbojet engine by implementing a trained multilayer neural network, said at least one portion corresponding to a physical modelling distinct from that of other portions of said aerial vehicle, and other modules of said set of modules are configured to implement simulations based on behavior physical laws,
wherein the trained multilayer neural network has been trained to predict output data from input data supplied by at least one of said other modules, said input data comprising a set of variables which characterize a stream flow in the turbojet engine, said output data comprising variables which characterize normal and parallel components of body forces of the turbojet engine and being transmitted to at least one of said other modules,
said one or more processors operably connected to a non-transitory computer readable medium comprising instructions, that, when executed, cause said simulator to:
receiving configuration data of a design of the aerial vehicle,
perform a simulation of the system and output results of the simulation;
assess the results of the simulation based on an objective function, said assessing comprising measuring an accuracy of the simulation and determining areas in a simulated system, wherein the accuracy of the simulation is insufficient according to an expected result, to automatically decide a strategy to trigger updates of parameters associated to said trained multilayer neural network,
when a decision is made, triggering said updates of parameters associated to said trained multilayer neural network is made, according to said strategy, so as to improve an accuracy of subsequent simulations; and
iterating by the simulator the performing of a simulation using the updated trained multilayer neural network module and the assessing of the results of the simulation.

8. The method of claim 1, wherein assessing the results of the simulation includes deriving an assessment from a measurement of energy in computational fluid dynamics based software.

* * * * *